(No Model.)

J. SHERRETT.
ANIMAL TRAP.

No. 534,014. Patented Feb. 12, 1895.

Witnesses:
C. E. Ricker
L. Seymour

Inventor:
John Sherrett

UNITED STATES PATENT OFFICE.

JOHN SHERRETT, OF NORFOLK, OREGON.

ANIMAL-TRAP.

SPECIFICATION forming part of Letters Patent No. 534,014, dated February 12, 1895.

Application filed May 29, 1894. Serial No. 512,943. (No model.)

*To all whom it may concern:*

Be it known that I, JOHN SHERRETT, a citizen of the United States, residing at Norfolk, in the county of Douglas and State of Oregon, have invented a new and useful Trap, of which the following is a specification.

My invention, consists of a trap, the objects of which are, first, to provide a trap continuously operating and self setting for an indefinite number of times; second, to adapt its use to the size of any animal by making it in any size desired, or necessary. I attain these objects by the mechanism illustrated in the accompanying drawings, in which—

Figure 1:
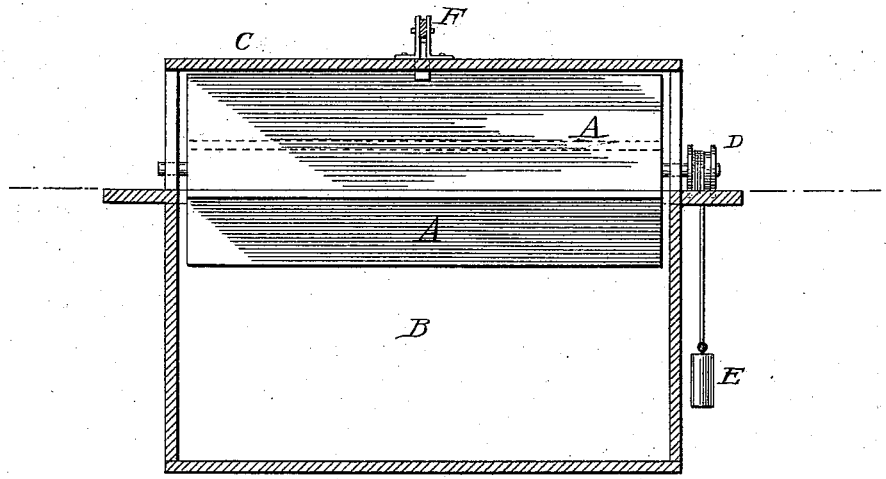
Figure 2:
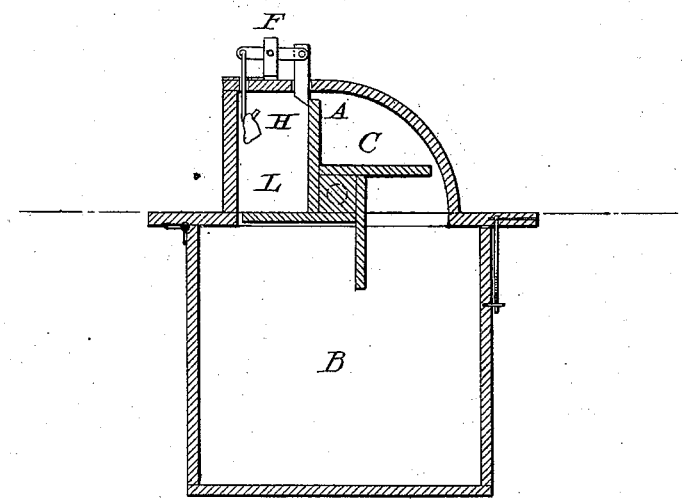

Figure 1, is a vertical section of the entire trap. Fig. 2, is a cross section showing the trap as it appears when set.

Similar letters refer to similar parts throughout the two views.

In Fig. 1, the rotary platform A, having four leaves, is placed in an inclosed box, C, as in Fig. 2, and above the water tank B.

In Fig. 1, D, is a pulley attached to the axle of the rotary platform A, to which is attached a weight E, to keep the leaves in a horizontal position, and if necessary to economize space shall run the line attached to weight E, over a sheave in an upright standard, or I may use a spring instead of the weight for the same purpose.

In Fig. 2, F, is the trigger, as shown in the drawings, to which is attached a wire baited at H, in the entrance, or aperture L.

The trap is set as in Fig. 2, and operates as follows: The animal enters, L, which is an aperture extending the entire length of the box C, open at either end and, standing on one of the leaves, seizes the bait H, which liberates the rotary platform A, causing it to turn, and by his own weight precipitates himself into the water tank B.

I may desire to use the trap in the box, C, without the tank B, attached. In that case, I claim the right to use any suitable receptacle.

I am aware that prior to my invention, box traps have been made and used, but

What I do claim, and desire to secure by Letters Patent, is—

An animal trap comprising a covered base, an opening therein, a four leaved rotary platform pivoted in the same, a runway formed by the side and top of the cover and two of the leaves, a standard secured to the exterior of said cover, a lever centrally pivoted to said standard and having a depending bait hook at one extremity, and a latch at the other, and both passing through openings in the top, the latch bearing against one side of the platform leaf to arrest the same until the bait hook is drawn upon, and means to rotate the platform.

JOHN SHERRETT.

Witnesses:
C. E. RICKER,
O. B. HINSDALE.